Sept. 16, 1941.   E. O. SHREFFLER   2,256,059
CLUTCH CONTROL CONSTRUCTION
Filed Jan. 30, 1941

Inventor.
Elwyne O. Shreffler.
by James R. McKnight,
Attorney.

Patented Sept. 16, 1941

2,256,059

UNITED STATES PATENT OFFICE 2,256,059

CLUTCH CONTROL CONSTRUCTION

Elwyne O. Shreffler, Manteno, Ill.

Application January 30, 1941, Serial No. 376,604

2 Claims. (Cl. 192—99)

My invention relates to a clutch control construction wherein an air-tight member operated by the vacuum in the intake manifold is used for co-operative control of the clutch in its operation by the operator.

In the starting of an automobile in first speed there is considerable movement of the clutch during its engagement to start movement of the car until its positive carrying of the load. In starting a car in second or third speeds there is a substantial decrease in the above movement of the clutch and at the same time a great increase in load. In fact the movement provided for the clutch in starting a car in third speed is at such a minimum that the clutch is extremely sensitive to slippage, and is very difficult for the average driver to control.

It is among the objects of my invention to provide means for a clutch so that it may be operated to start the same automobile in third speed with substantially the same or greater accuracy that has always been present in starting in first speed. To create means whereby any clutch may be so adapted. To supply means which will semi-automatically co-operate with the clutch in its physical operation by the driver of the car. To provide a clutch control construction enabling a driver to use third speed for starting with greater ease and efficiency than starting in first speed, eliminating further clutch operations, and resulting in greater safety and economy in the consumption of and the saving of waste in gasoline and oil, and wear on parts.

My invention contemplates such other objects, advantages and capabilities as will later more fully appear and which are inherently possessed by my invention.

While I have shown in the accompanying drawing a preferred form of my invention yet I desire it understood that the same is susceptible of modification and change without departing from the spirit of my invention.

Figure 1:
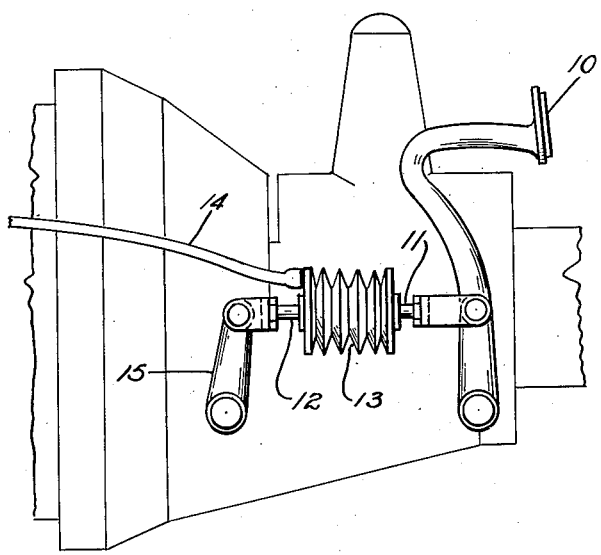
Figure 2:
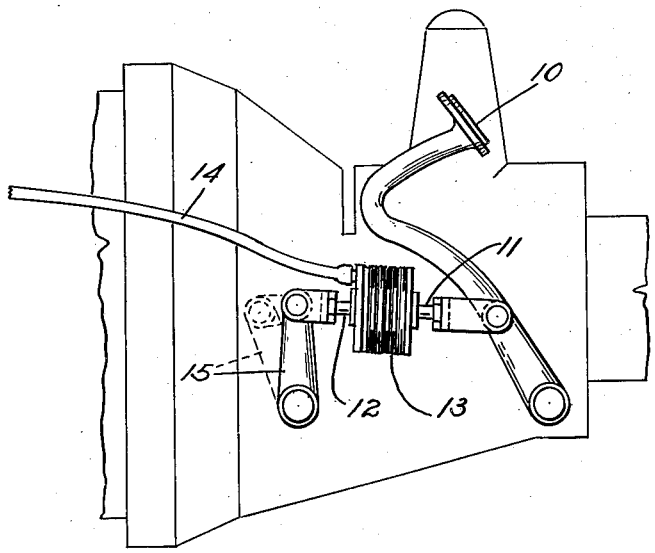

Referring to the drawing, Fig. 1 is an elevational view of a preferred form of my clutch control construction with the air-tight member in maximum expanded position; Fig. 2 is a similar view with the air-tight member in maximum collapsed position.

The embodiment selected to illustrate my invention comprises a clutch pedal 10. Pivotally attached to clutch pedal 10 is a clutch control linkage having two parts 11 and 12 separated by a flexible, compressible, hollow air-tight member 13. An air-tight connection or tube 14 leads from said air-tight member to the intake manifold of the automobile.

The inner ends of clutch control linkage 11 and 12 are attached to opposite portions of the air-tight member 13. The outer end of clutch control linkage is attached to clutch release arm 15.

In operation of my construction let us assume that the motor of the automobile has not yet been started. The air-tight member 13 is in expanded condition. Upon starting the motor the suction of the motor creates a vacuum in the intake manifold which withdraws the air by means of tube 14 from air-tight member 13, causing it to collapse to flat condition. Upon increasing the speed of the motor, the vacuum in the intake manifold drops in proportion, permitting air to pass through tube 14 to air-tight member 13 causing the same to expand to a corresponding degree. The greater the load the less vacuum there is in the intake manifold and the more expansion there is of air-tight member 13. Thus the control is in this sense automatic. As air-tight member 13 expands during the operation of the clutch pedal 10 by the operator of the car, the distance between parts 11 and 12 of the clutch control linkage is increased. This permits a greater movement of the clutch between its engagement to start movement of the car and its positive carrying of the load. This greater distance of movement enables the operator to accurately control the clutch and provides a great period of slippage before positive engagement. The expansion of the air-tight member acts as an arresting means in co-operating with the driver in his physical operation of the clutch pedal. A smooth even start in second or third speeds is obtained with my construction in all late models, because there is sufficient power in these cars. My construction affords that increase in extent or arrest of movement of the clutch which will enable an average driver to control the same for a successful start in second or third speeds.

It is within the contemplation of my invention that the placing of my air-tight member 13 is not limited to the linkage parts 11 and 12 illustrated and described herein as a preferred form, but that said air-tight member 13 may be operable between any operating or linkage parts between the clutch pedal and the clutch plate, and may operate to increase or decrease, arrest or expedite the movement of the control means of the clutch.

Having thus described my invention, I claim:

1. In combination with the clutch and intake manifold of an automotive vehicle, said clutch having a pedal and a release arm, linkage having parts between and attached to the pedal and to the release arm, a compressible air-tight member attached to and separating parts of said linkage, and an air-tight connection leading from said air-tight member to the intake manifold.

2. In combination with the clutch and intake manifold of an automotive vehicle, said clutch having a clutch pedal and a clutch release arm, two parts of clutch control linkage, the outer end of one of said parts pivotally attached to said clutch pedal, the outer end of the other of said parts pivotally attached to said clutch release arm, a compressible air-tight member, the inner ends of said parts attached to opposite portions of said air-tight member, and an air-tight connection leading from said air-tight member to the intake manifold.

ELWYNE O. SHREFFLER.